United States Patent Office 3,606,416
Patented Sept. 20, 1971

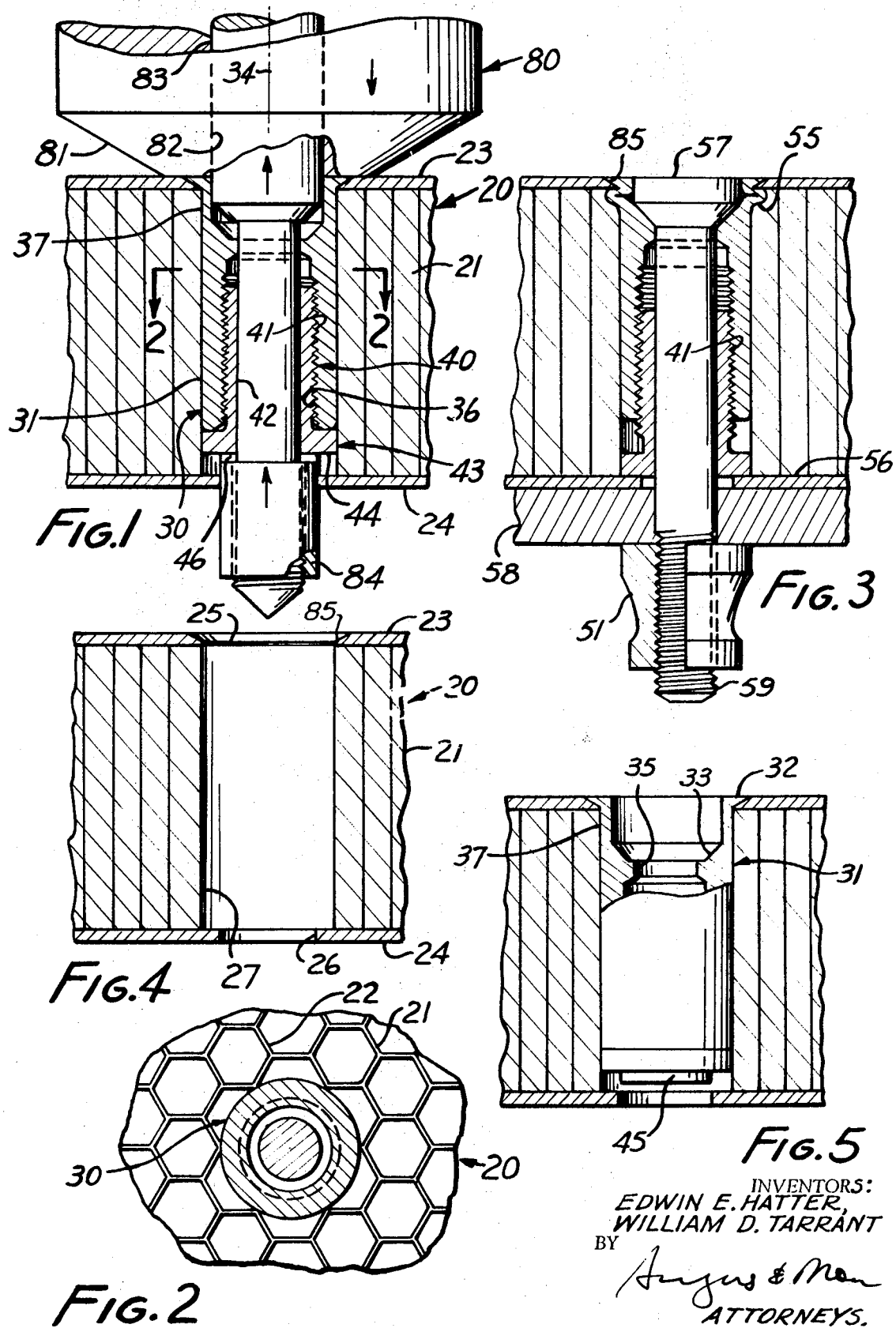

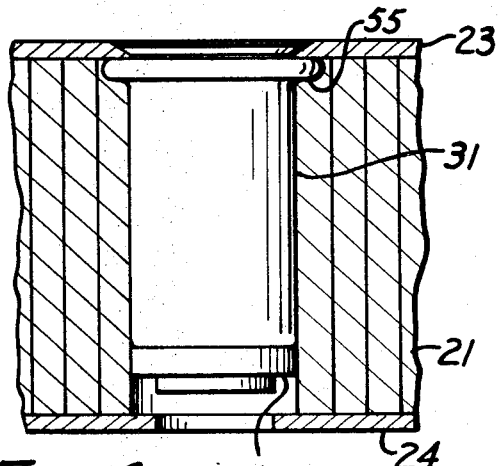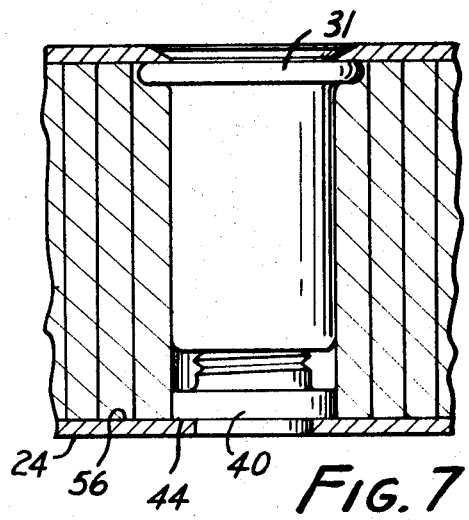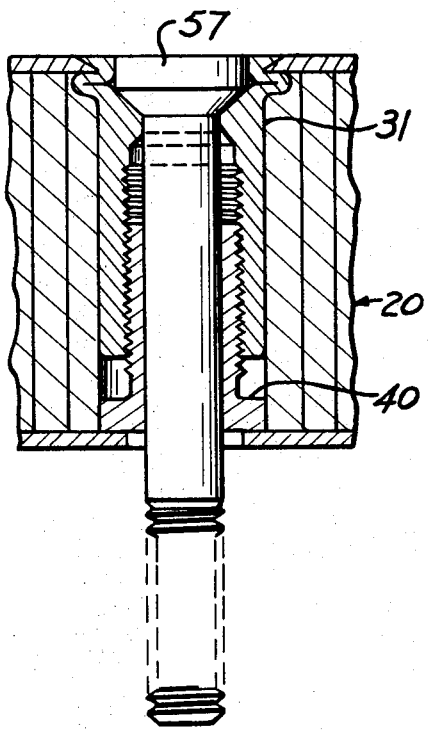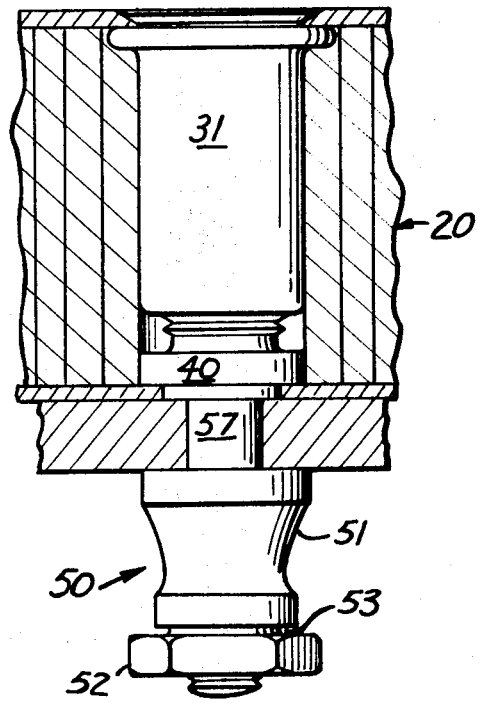

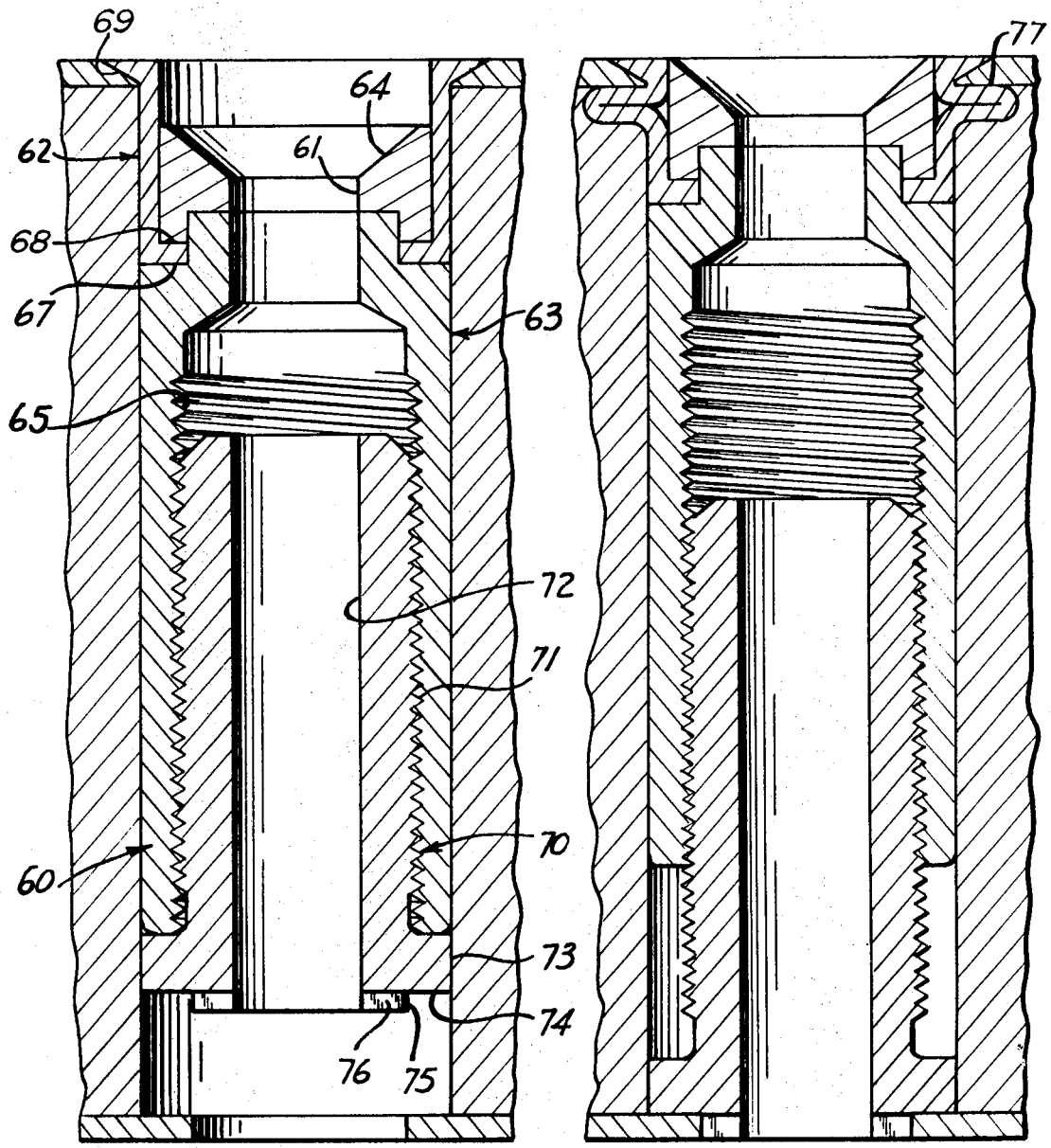

3,606,416
HONEYCOMB FASTENER
Edwin E. Hatter and William D. Tarrant, Fountain Valley, Calif., assignors to Hi-Shear Corporation, Torrance, Calif.
Filed Feb. 11, 1970, Ser. No. 10,474
Int. Cl. F16f 7/00
U.S. Cl. 287—189.36            9 Claims

ABSTRACT OF THE DISCLOSURE

A fastener for attaching a structure to a honeycomb body comprising a sleeve and a spacer that are threadedly attached to each other. The sleeve bears means for attachment to one of the skin sheets of the honeycomb body, and the spacer has an abutment surface adapted to be threaded down into contact with the other of said skin sheets so as to clamp said other sheet between itself and a workpiece which is to be attached to the body. The fastener transfers both shear and tensile loads to the honeycomb body, and the threaded joinder of the sleeve and spacer makes the grip range delicately adjustable, and protects the honeycomb body from crushing while the fastener is being set.

---

This invention relates to a fastener for attaching structure to a honeycomb body.

Numerous structures have been proposed for attaching workpieces to a honeycomb body. A typical honeycomb body includes a core which is sandwiched between a pair of skin sheets that are bonded to it. The honeycomb body is designed to have an optimum strength to weight ratio, and it has proved to be a difficult matter to make reliable connections to it due to the inherent low strength of the members of the honeycomb body. It is an object of this invention to provide means for transmitting both shear and axial loads to both sheets of the honeycomb, an objective which has not heretofore successfully been attained, together with the advantage of limiting the axial crushing forces which can be applied thereto.

A fastener according to this invention comprises a sleeve and a spacer which are threaded together. The sleeve has means for attaching it to one of the skin sheets of the honeycomb body, and the spacer carries an abutment surface such as a shoulder which can be brought against the inside of the other of the skin sheets so as to clamp said skin sheet between itself and a workpiece that is attached to the fastener.

According to a preferred but optional feature of the invention, the means for attaching the sleeve to its respective skin sheet comprises a reduced section in the wall of the sleeve adapted to bulge outwardly to form a bulb for trapping the skin sheet between the bulb and a head carried by the sleeve.

The above and other features of this invention will be fully understood from the following detailed description and the accompanying drawings, in which:

FIG. 1 is a side view partly in cutaway cross-section showing the presently preferred embodiment of the invention in the course of being set;

FIG. 2 is a cross-section taken at line 2—2 in FIG. 1;

FIG. 3 is a side elevation partly in cutaway cross-section showing a completed joint according to the invention;

FIGS. 4–9 show successive steps in the assembly of the device; and

FIGS. 10 and 11 are cross-sections showing the unset and set conditions of another embodiment of the invention.

FIG. 1 shows a honeycomb body 20 to which a workpiece is to be attached. The body includes a core 21 of honeycomb material having voids 22 (FIG. 2) therein. A first and second skin sheet 23, 24 are attached to opposite sides of the core, such as by bonding, thereby making a solid honeycomb structure. Aligned holes 25, 26 are formed in the sheets and a hole 27 is formed in the core in alignment therewith so as to admit a fastener 30 according to the invention. The diameter of hole 25 is greater than that of hole 26.

Fastener 30 in its preferred embodiment as shown in FIG. 1 includes a sleeve 31 having a countersink head 32 at one end thereof, a countersink 33 adjacent to the head, and extending along central axis 34, a passage 35 and an internal axial thread 36.

The other part of the fastener is a spacer 40 having an external thread 41 an internal passage 42 aligned with passage 35, an external shoulder 43 with a bearing surface 44 thereon, and an extension 45 bearing a screw driver slot 46 therein. The outer diameter of the extension is slightly smaller than that of second hole 26, and the outer lateral dimensions of shoulder 43 and bearing surface 44 are greater than the diameter of that hole. A collapsible section 37 is formed in the counterbore. This constitutes the thinnest section of the sleeve, and is least resistive to columnar failure under axial compressive loading.

A nut 50 for use with the presently preferred joint of the invention is shown in FIGS. 3 and 9. This is the nut which is commonly known in the trade as the "Hi-Lok" shown in United States Pat. No. 2,940,495, issued June 14, 1960 to George S. Wing. Briefly, it includes a threaded body 51 joined to a driving section 52 by a shear section 53 which latter shears at a predetermined torque so that the driving section separates from the body at a given predetermined applied torque.

The fastener is intended to be set as shown in FIG. 3 with a bulge 55 formed by the endwise compressive failure of collapsible section 37 which has caused it to bulge out, displacing the material of the core, so as to clamp the inner edge of the first sheet between itself and the countersink head. The spacer has been threaded downwardly utilizing the screw slot to do so, and it bears against the inner surface 56 of second skin sheet 24. A core bolt 57 has been pulled into the passages so that it bears against the base of countersink 33, passes snugly through passage 42 in the spacer, through the second skin, through a hole in workpiece 58, and its external thread 59 is engaged by nut 50 so as to hold the workpiece firmly engaged to the core bolt with the second skin sheet clamped between the workpiece and the shoulder on the spacer and the first sheet clamped between the bulge and the countersink head.

FIGS. 10 and 11 show another embodiment of the invention. This fastener 60 includes a retainer 61, and a sleeve comprised of two sleeve members 62, 63. The retainer bears countersink 64, and sleeve member 63 bears internal thread 65. An internal shoulder 67 on sleeve member 62 bears against step 68 of sleeve member 63. The retainer clamps shoulder 67 against step 68 when the core bolt is installed so as to hold the two sleeve members together in a unitary stack after installation. A countersink head 69 is formed on sleeve member 62.

Fastener 60 also includes a spacer 70 with an external thread 71, internal passage 72, external shoulder 73, bearing surface 74, extension 75, and screw driver slot 76 all as in the previous embodiment.

It will be noted that the difference between this embodiment and that of FIGS. 1 and 3 is that bulge 77 is formed on a separate part from that which carries the threads. Joinder between the two parts is made by the core bolt (not shown) which holds them together. This arrangement enables the two sleeve members to be made of optimum materials for their respective purposes, one for bulging and the other for strength of threads.

The setting of the two fasteners is identical so that only that of FIGS. 1 and 3 will be described. The first step in the setting process is shown in FIG. 1 wherein a tool 80 having an anvil 81 adapted to be pressed against the countersink head has an internal passage 82 in which is fitted a puller stem 83. This stem is passed through the two parts of the fastener and the fastener is then inserted into the workpiece. A puller nut 84 is threaded onto the end of puller stem 83. Then the puller stem is pulled relative to the anvil, and bulge 55 is formed as shown in FIG. 3 by columnar collapse. Thereafter, puller nut 84 is removed and the tool is removed. Then a screw driver is inserted through hole 26 to engage the screw driver slot and the spacer is turned so as to move it down until its bearing surface bears against the inside wall 56 of the second skin sheet. Then core bolt 57 is passed through the hole, the workpiece is placed over the core bolt, and nut 50 is torqued until the driving section shears off leaving the device entirely assembled.

It will now be seen that the first sheet is clamped between the bulge and the countersink hole and the second sheet is clamped between the bearing surface and the workpiece and that there is a full transmission both axial and in shear of the forces between the workpiece and the honeycomb, with the nut set to a predetermined torque, and the core bolt with a predetermined axial tensile preload.

It will further be noted that nut 50 can be tightened down without risk of crushing the core material for the reason that the threaded joinder between the sleeve and the spacer will cause the fastener to be sufficiently rigid as to maintain its length even against axial compressive forces thereby protecting the core against crushing. Furthermore, the adjustability of length of the fastener enables a device of given size to be used throughout a wide grip range, and to fit the respective spacing and rigidly join the two skin sheets without having to crush the core material.

It is evident that torque-limiting nuts need not be used. Any nut can be used, with or without torque limitation. However, this fastener is unique in that with its accommodation to different lengths and its resistance to crushing loads, a predetermined torque may be applied without concern for crushing the core material. With other devices, torque loads must be carefully observed lest the honeycomb body be damaged.

The sequential steps of setting the device are shown more fully in FIGS. 4–9. FIG. 4 shows the prepared hole with a countersink 85 on the first sheet 23. Then the fastener is shown in FIG. 5 placed in the aligned holes with the spacer standing short of the second sheet. FIG. 6 shows the result of the upsetting of the head end. FIG. 7 shows the spacer moved into contact with the inside surface of the second sheet. FIG. 8 shows the core bolt installed. FIG. 9 shows the initial stage of driving nut 50, and the final stage is shown in FIG. 3 where the driving section of the nut has sheared off.

There is thereby provided a strong, efficient and inexpensive fastener for honeycomb bodies and a unique method for installing the same, with a single fastener having the capability of being useful throughout a wide range of grip lengths.

I claim:

1. A fastener for attaching structure to a honeycomb body, which honeycomb body comprises a core and a pair of skin sheets which are attached to each side of the core, said fastener being adapted to engage both of said sheets and to extend between them, being attached to one and abutting the other, said fastener comprising a sleeve and a spacer, said sleeve having an axis and comprising an axially extending thread, a head adjacent to one end of the spacer, and a collapsible section of least resistance to columnar failure spaced from the head to form a bulge outwardly under axial endwise compression, thereby to form a clamping connection with a first one of said sheets, the spacer comprising a shank, an external shoulder, an axial passage extending through the spacer, and a thread engageable with the thread on the sleeve means to rotate the spacer with a tool, the spacer being turnable to bring its shoulder into bearing with the other of said sheets after the sleeve is engaged to the first-named sheet.

2. A fastener according to claim 1 in which the sleeve and the spacer have aligned central passages to pass a shanked core bolt therethrough.

3. A fastener according to claim 1 in which the sleeve comprises a first sleeve member, a tubular second sleeve member with an internal shoulder, and a retainer adapted to fit inside the second sleeve member and press the shoulder against the first sleeve member.

4. A fastener according to claim 3 in which the sleeve and spacer have aligned central passages to pass a shanked core bolt therethrough.

5. A fastener according to claim 3 in which the second sleeve member carries said head.

6. A joint comprising an apertured workpiece, a core bolt, a nut, and a fastener for attaching structure to a honeycomb body which honeycomb body comprises a core and a pair of skin sheets which are attached to each side of the core, said fastener being adapted to engage both of said sheets and to extend between them, being attached to one and abutting the other, said fastener comprising a sleeve and a spacer, said sleeve having an axis and comprising an axially extending thread, an axial passage extending through the sleeve, a head adjacent to one end of the spacer, and a collapsible section of least resistance to columnar failure spaced from the head having formed an outward bulge under axial endwise compression, thereby to form a clamping connection with a first one of said sheets, the spacer comprising a shank, an external shoulder, an axial passage extending through the spacer, and a thread engageable with the thread on the sleeve, means to rotate the spacer with a tool the spacer having been turned to bring its shoulder into bearing with the other sheet after the sleeve is engaged to the first-named sheet, the core bolt passing through said passages and the aperture in the workpiece, and the nut having brought the workpiece and said other sheet into abutment with one another.

7. A joint according to claim 6 in which the sleeve comprises a first sleeve member, a tubular second sleeve member with an internal shoulder, and a retainer adapted to fit inside the second sleeve member and press the soulder against the first sleeve member.

8. A joint according to claim 7 in which the second sleeve member carries said head.

9. The method of joining a shanked fastener and a workpiece to a honeycomb structure which has a core and a pair of sandwiching skin sheets compprising: forming an aperture through the honeycomb body, placing a two portion threadedly assembled fastener in said holes, attaching by columnar failure one of said portions to one of said skin sheets, threading the other portion relative to the first so as to bring it into contact with the inside surface of the other skin sheet, applying the workpiece to a core bolt passed through the fastener, and applying a nut to the core bolt and bringing it against the workpiece in order to bring the workpiece into contact with said other skin sheet so as to clamp the same between the fastener and the workpiece.

References Cited

UNITED STATES PATENTS

| | | | |
|---|---|---|---|
| 3,007,364 | 11/1961 | Dickie | 287—189.36FX |
| 3,285,311 | 11/1966 | Cushman | 52—617X |
| 3,296,765 | 1/1967 | Rohé et al. | 52—617 |
| 3,313,079 | 4/1967 | Phelan | 287—189.36FX |
| 3,339,003 | 8/1967 | Cessna | 287—189.36FX |
| 3,434,262 | 3/1969 | Lawrence | 52—617 |
| 3,443,473 | 5/1969 | Tritt | 52—617X |
| 3,523,395 | 8/1970 | Rutter et al. | 287—189.36DX |

DAVID J. WILLIAMOWSKY, Primary Examiner

W. L. SHEDD, Assistant Examiner